Figure 1:
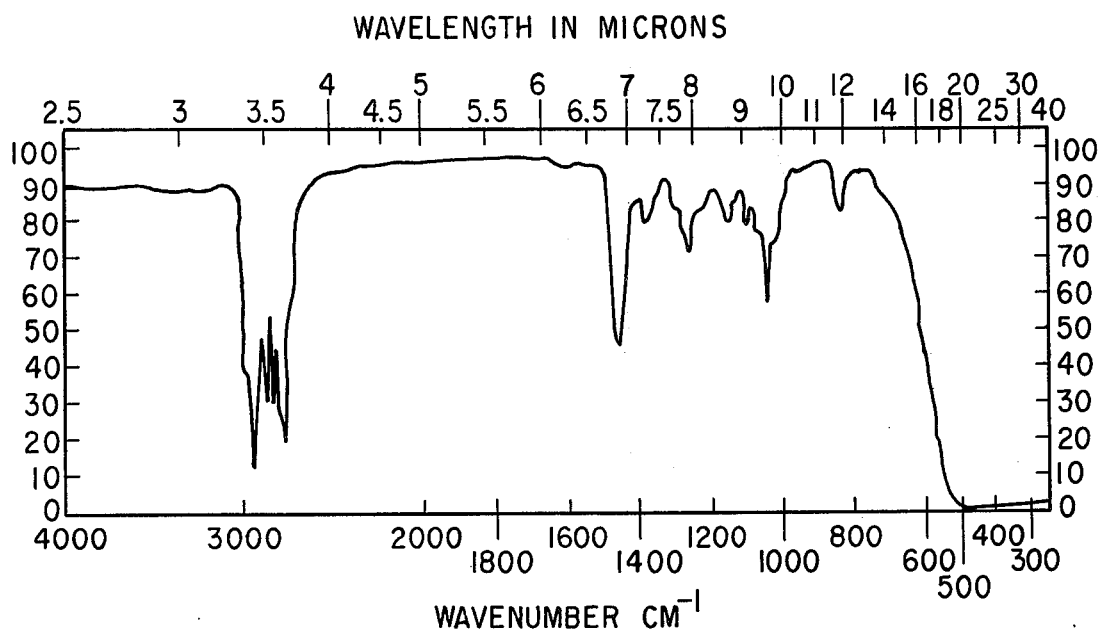

United States Patent [19]
Langer, Jr. et al.

[11] 3,880,925
[45] Apr. 29, 1975

[54] SEPARATION AND PURIFICATION OF CIS AND TRANS ISOMERS
[76] Inventors: Arthur W. Langer, Jr., 175 Oakwood Rd., Watchung, N.J. 07060; Thomas A. Whitney, 812 Washington Ave., Linden, N.J. 07036
[22] Filed: Apr. 3, 1972
[21] Appl. No.: 240,870

Related U.S. Application Data
[60] Division of Ser. No. 872,955, Oct. 31, 1969, abandoned, which is a continuation-in-part of Ser. No. 808,328, March 18, 1969, Pat. No. 3,734,693.

[52] U.S. Cl................................................ 260/563 R
[51] Int. Cl............................................. C07c 87/38
[58] Field of Search ............................... 260/563 R

[56] References Cited
OTHER PUBLICATIONS
Winternitz et al., Bull. Soc. Chim., France 1956.

*Primary Examiner*—Lewis Gotts
*Assistant Examiner*—D. R. Phillips
*Attorney, Agent, or Firm*—John Paul Corcoran

[57] ABSTRACT
Process for separating trans cyclohexane diamine from a mixture of cis and trans isomer diamine by converting them to their respective dihydrochlorides in a methanol solution and then recovering a major amount of the trans isomer thereof.

3 Claims, 4 Drawing Figures

SEPARATION AND PURIFICATION OF CIS AND TRANS ISOMERS

CROSS REFERENCES

This is a division of applications Ser. No. 872,955 filed Oct. 31, 1969, now abandoned, which in turn is a continuation-in-part of application Ser. No. 808,328, filed Mar. 18, 1969, now U.S. Pat. No. 3,734,693 issued May 22, 1973.

PRESENT INVENTION

It has now been unexpectedly discovered that it is possible to separate chelating agents from other materials by complexation with certain lithium salts. Thus, it has been found that chelating agents can be separated from non-chelating agents of very similar physical and chemical properties. It has also been discovered that chelating agents can be separated from other chelating agents even when the chelating agents to be separated are structural isomers of one another. Further, it has been found to be possible to separate cis- and trans-isomers of the same chelating agent from each other. Thus, the cis- and trans-isomers of N,N,N',N'-tetramethyl-1,2-cyclohexanediamine, which have never been previously isolated in pure form, have been separated from one another and from other materials. It has even been found to be possible to resolve a racemic mixture of an asymmetric or dissymmetric chelating agent into its optical antipodes by choice of the proper optically active lithium salt.

It has also been found to be possible to separate lithium salts by complexation with certain chelating agents. A particularly useful application of this separation involves the use of an amino acid as the anion in the lithium salt. Thus, amino acids may be separated from impurities and from one another. A lithium salt can also be separated into its respective optical antipodes by making use of optically active chelating agents. Where the anion of the lithium salt is derived from an amino acid, it becomes possible to resolve said amino acid into its d- and l-forms by complexing the salt with optically active chelating agents.

A further object of this invention includes unique methods for separation of cis- and trans-isomers of cyclohexanediamine (CHDA), a precursor of N,N,N',N'-tetramethyl-1,2,-cyclohexanediamine (TMCHD), from one another. Several methods utilizing different solubilities of the dihydrochloride derivatives of the respective isomers inn methanol and ethanol are also described.

The Inorganic Lithium Salt

The first inorganic lithium salt employed in the separation and/or purification of chelating agents is one having a lattice energy less than about that of lithium hydride, preferably no greater than about 210 kilocalories per mole (measured at about 18°C). The lattice energies of various inorganic lithium salts may be found in the "Handbook of Electrochemical Constants" by Roger Parsons (Academic Press, 1959).

The lithium salts useful for this invention must have less than the requisite maximum lattice energy and must also be inorganic in nautre; they will normally have melting points less than about 650°C. The term "inorganic," for the purposes of this invention, means that there is no hydrocarbon radical bonded directly to the lithium atom and any hydrocarbon radical present in the anion moiety must be indirectly bonded to the lithium through a third atom other than carbon. Thus, lithium compounds such as n-butyllithium and phenyllithium do not meet the criteria and are outside the scope of this invention. On the other hand, compounds of the type $LiNH_2$, $LiCN$, $LiSCN$, $LiSH$, $Li_2CO_3$, $LiNCO_3$, $LiAlR_2Cl_2$, $LiAlH(OR)_3$, $LiBH(OR_3)$, $LiOR$, $LiNHR$ or $LiNR_2$, $LiSR$, $LiPR_2$, $LiOOCR$, also $LiOR^*$, $LiOOCR^*$, $LiNR^*R'$, etc., wherein the (*) indicates an optically active radial, are within the scope of this invention.

Specific nonlimiting examples of useful inorganic lithium salts are those in which the anion is: amide, azide, chlorate, cyanide, chloride, bromide or iodide, iodate, nitrate, hypochlorite, nitrite, thiocyanate, perchlorate, $Br_3$, $I_3$, $ClBr_2$, $ICl_4$, $BrF_4$, $IF_6$, $IBr_2$, etc.

Also useful are those inorganic lithium salts in which the anion is a complex metal anion which may be represented by the formula $R''_n MX_m$ wherein n is an integer of 0 to 6, inclusive, depending on the valence of M, m is an integer and $(n + m - 1)$ equals the valence of M, X is a halogen or pseudohalogen, $R''$ is a $C_1$–$C_{20}$ alkyl, aryl or aralkyl radical and M is a metal selected from the group consisting of beryllium: magnesium; Group 1b elements (i.e., Cu, Ag, Au); Group 2b elements (i.e., Zn, Cd. Hg); Group 3 elements (e.g., B, Al, Ga); Group 4a elements other than carbon and silicon; Group 5a elements other than nitrogen (e.g., P, As, Sb, Bi); and the transition metals, i.e. subgroup b of Groups 4 through 8 (e.g., Fe, Co, Ni, Ti, Zr, V, Cr, Mn). The Periodic Table employed in describing this invention is that which appears on the back cover of "Handbook of Chemistry and Physics" (Chemical Rubber Co., 49th Edition).

Nonlimiting examples of useful complex metal anions include the hydridoaluminates, the hydridoborates, the chloroaluminates (tetra-, hepta-, etc.), the aluminum alkyl halides, $AuBr_4$, $BF_4$, $BeCl_4$, $SnCl_6$, $PF_6$, $TiCl_6$, $FeCl_4$, $Cr(CO)_5I$, $MnCl_3$, $Ni(CN)_4$, $VF_6$, $HgCl_3$, $B_2H_7$, $UF_4$, $AsF_6$, etc.

Preferably, the inorganic lithium salt is one of the following: lithium chloride, lithium bromide, lithium iodide, lithium nitrate, lithium hexafluophosphate, lithium tetrafluoborate, lithium tetraphenylborate, lithium perchlorate, lithium azide, $LiAsF_6$, $Li_2BeF_4$, lithium nitrite, lithium thiocyanate, $LiBr_3N_3$, etc.

The Chelating Agent

The chelating agent contains at least two functionalities: at least one functionality is a secondary amine group, a tertiary amine group, a secondary phosphine group, a tertiary phosphine group, or a thioether group; at least one other functionality is a secondary amine group, a tertiary amine group, a secondary phosphine group, a tertiary phosphine group, a thioether group, or an ether group.

The chelating agent has one required functionality in a spatial relationship with the other required functionality(ies) in the molecule such that co-ordinate bonds are established between the functionalities and the lithium cation of the inorganic lithium salt. Furthermore, the ring size of the resulting complex must be greater than 3 and less than 8 members including the Li atom.

The chelating complexing agent may be sparteine, an N,N'-di-($C_1$-$C_4$ alkyl) bispidin, tris-2(dimethylaminoethyl)-amine as well as those compounds falling within the scope of the following general formulas:

I. 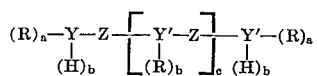

II. 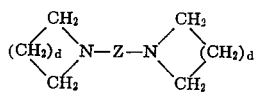

III. 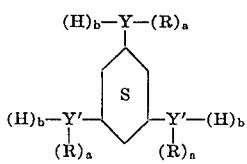

IV. 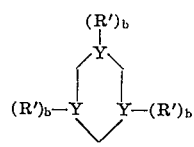

wherein $a$ is 1 or 2, depending on the valence of Y or Y'; $b$ is 0 or 1, depending on the valence of Y or Y'; $c$ is an integer of 0 to 10,000, inclusive; $d$ is an integer of 0 to 3, inclusive; R is the same or different $C_1$–$C_4$ alkyl radical, R' is hydrogen or is the same or different $C_1$–$C_4$ alkyl radical or $C_6$–$C_{10}$ aryl or aralkyl radical; Y is a nitrogen, sulfur or phosphorus atom; Y' is a nitrogen, oxygen, sulfur or phosphorus atom, and Z is a nonreactive radical selected from the group consisting of (1) $C_4$–$C_{10}$ cycloaliphatic or aromatic radicals and their lower alkyl derivatives wherein said radicals are attached to the Y and Y' atoms in Formula I and the nitrogen atoms in Formula II at 1,2-positions on the aromatic rings or 1,2- or 1,3-positions on the cycloaliphatic rings; and (2) 1 to 4 methylenic radicals wherein each methylenic radical contains 0 to 2 monovalent hydrocarbon radicals of 1 to 6 carbon atoms.

Preferably, the chelating agent has (a) at least one Y being nitrogen and at least one Y' being oxygen (i.e., an aminoether) or (b) all the Y and Y' atoms being the same atom (i.e., polyamines, polyphosphines, and polythioethers). It should be understood that the prefix "poly" employed in describing the chelating agents means that the chelating agent is a monomer or a polymer in the classical sense and that such monomer or polymer has two or more of the same functionalities.

Suitable nonlimiting examples of chelating agents falling within the scope of the above formulas are:

Cis-N,N',N'-tetramethyl-1,2-cyclopentanediamine; N,N,N',N'-tetramethyl-1,2-cyclohexanediamine (cis-, trans-, or mixtures); N,N,N'N'-tetramethyl-o-phenylenediamine; 4-ethylN,N,N',N'-tetramethyl-o-phenylenediamine; N,N,N'',N''-tetramethylN'-phenyl diethylene-triamine; N,N,N',N'-tetramethyl-1,2-ethanediamine; N,N,N',N'-tetramethyl-1,3-propanediamine; N,N,N',N'',N''-pentamethyl-diethylene-triamine; N,N,N',N'-tetramethyl-1,2-propanediamine; N,N'-dimethyl-N,N'-diethyl-1,2-ethanediamine; N,N,N',N'-tetramethyl-1-cyclohexyl-1,2-ethanediamine; N,N,N',N'-tetramethyl-2,3-butanediamine; N,N,N',N'-tetramethyl-1,4-butanediamine; N,N,N',N'',N''',N'''-hexamethyltriethylenetetramine; poly-(N-ethyl-ethyleneimine); poly-(N-methyl ethyleneimine); N,N,N',N'-1,8-naphthylenediamine; beta-(dimethylamino)ethyl methyl ether; beta-(diethylamino)ethyl ethyl ether; bis-(beta-dimethylamino)ethyl ether; beta-(dimethylamino)-ethyl ethyl ether; gamma-(dimethylamino)propyl methyl ether; orthodimethylamino anisole; 1-dimethylamino-2-dimethylphosphine ethane; bis(beta-dimethylaminoethyl) methyl phosphine; beta-(dimethylamino)ethyl methyl sulfide; 1,2-dipiperidylethane; tris-(1,3,5-dimethylamino) cyclohexane; N,N',N''-trimethhl-1,3,5-hexahydro- s -triazine; etc.

Particularly preferred, since they generally give rise to hydrocarbon-soluble complexes, are those chelating agents which are (1) tertiary polyamines (i.e., all of the heteroatoms are tertiary nitrogen atoms) containing at least 5 carbon atoms and at least 2 tertiary nitrogen atoms and (2) tertiary aminoethers (i.e., all nitrogen atoms present are tertiary nitrogen atoms) containing at least 5 carbon atoms and at least 1 tertiary nitrogen atom and at least one ether group. Especially preferred species of the chelating tertiary polyamines are N,N,N',N'-tetramethyl-1,2,-ethanediamine, N,N,N',N'-tetramethyl-1,3-propanediamine, N,N,N',N'-tetramethyl-1,2-cyclohexanediamine (cis-, trans-, or mixtures), N,N,N',N'',N''-pentamethyl diethylene-triamine, N,N,N',N'',N''',N'''-hexamethyl triethylenetetramine, tris-(beta-dimethylaminoethyl) amine, poly-(N-methyl ethyleneimine), etc. Especially preferred species of the tertiary aminoethers are beta-(dimethylamino)-ethyl methyl ether, 2-methoxycyclohexyl dimethylamine, etc.

It should be understood, that for purposes of this invention, the term "chelating isomers" encompasses: (1) geometric or cis- and trans-isomers of the same chelating agent, e.g., where trans-1,2-TMCHD (trans-N,N,N',N'-tetramethyl-1,2-cyclohexanediamine) could be considered the first chelating agent and its geometric isomer, cis-1,2-TMCHD, could be considered the chelating isomer of the first chelating agent; or cis-N,N,N',N'-tetramethyl-1,2-cyclooctanediamine could be considered the first chelating agent and its geometric isomer, trans-N,N,N',N'-tetramethyl-1,2-cyclooctanediamine, could be considered the chelating isomer of the first chelating agent; or cis-1,3-TMCHD, and trans-1,3-TMCHD, could be considered respectively the first chelating agent and the chelating isomer of the first chelating agent, etc.; (2) optical isomers of the same material, e.g., d-trans-1,2TMCHD and l-trans-1,2-TMCHD, d-sparteine and l-spartein; etc.

It should be understood that what is meant by a non-chelating agent having properties similar to a chelating agent is that the non-chelating agent possesses physical and chemical properties so similar to that of the chelating agent that it is extremely difficult or impossible to separate them by conventional methods (e.g., distillation, fractional crystallization, extraction, etc.). For instance, the chelating and non-chelating agents may have very similar structure, molecular weight, melting point, boiling point, solubility, etc. Their chemical similarities may be such that they form derivatives of the same type which are also very difficult or impossible to separate by conventional methods. Some examples include the separation of the non-chelating N,N,N',N'-tetramethyl-1,6-hexanediamine from the chelating N,N',N'-tetramethyl-1,2-cyclohexanediamine or the separation of 1,3-TMCHD, which forms a weak chelate (low stability chelate) with lithium salts, from 1,2-TMCHD which forms a strong chelate (highly stable chelate) with lithium salts.

Separation of the Chelating Agent

The desired material in a multi-component mixture may be separated and purified therefrom by first adding to said mixture an inorganic lithium salt having the requisite lattice energy so as to form a complex of substantially only one chelating agent, i.e., a complex of at least 80% purity, preferably at least 90% purity and most preferably at least 95% or greater purity. The amount of lithium salt used is determined by the particular complex to be formed. Generally from 0.25 to 50 moles of the chelating agent per mole of lithium salt is used; preferably the stoichiometric amount of the lithium salt is used; most preferably, if it is desired to obtain the complex which is formed at higher purity levels, slightly less than the stoichiometric amount of lithium salt is used based on the amount of chelating agent to be complexed.

After its formation, the complex (which is usually a solid) may be isolated from the multi-component mixture (e.g., by precipitation or filtration) leaving behind an effluent.

These two steps (i.e., complexation and isolation) are successively repeated using the proper lithium salt with possible variations in concentration and temperature until the complex which results is that of the desired chelating agent, or until the effluent contains substantially the single desired chelating agent or non-chelating agent.

Should the component desired be one of the chelating agents present in its complexed form, it may be obtained in pure form by isolation and destabilization of the complex. Destabilization is readily accomplished by addition of polar solvents to the complex (e.g., addition of water, ethylene glycol, methanol, etc.); addition of aqueous or anhydrous acids or bases (e.g., hydrochloric acid, sulfuric acid, acetic acid, sodium hydroxide, ammonium hydroxide, potassium hydroxide, etc.); or by heating the complex at a temperature in a range of about 30° to 250°C.; the uncomplexed chelating agent may then be recovered by conventional methods (e.g., distillation, extraction, etc.). Should the component desired remain in the effluent, it may be easily separated therefrom by distillation or extraction.

The purification and/or separation processes described above may, of course, be advantageously utilized with column and counterflow techniques, i.e., the inorganic lithium salt (complexed of uncomplexed) may be contacted with a countercurrent flow of a hydrocarbon solution of a chelating agent and the resultant complex may then be subjected to destabilization to recover the desired chelating agent in a pure state.

It is desirable in utilizing this invention to predict the ease of formation of the various possible complexes in the mixture. This depends directly on the relative stability of the various complexes; i.e., the most stable complexes are formed preferentially, followed by the next most stable complexes, etc. Generally, if the chelating agent forms a five-membered ring including the lithium atom, this complex will be more stable than the correspondingly formed six-membered ring, which in turn would be more stable than the correspondingly formed seven-membered ring (which is of approximately equivalent stability to the four-membered ring).

When the ring sizes formed by the chelating agents to be separated are equal, it is still possible to predict the more readily formed complex on the basis of entropy considerations. The chelating agent with the lowest negative entropy change upon forming a complex will complex preferentially. For instance, in the separation of 1,2-TMCHD from tetramethylethylenediamine (TMED), both of which form five-membered rings on complexation, one would predict that 1,2-TMCHD would complex preferentially because of entropy considerations. In 1,2-TMCHD, the rotational freedom of the nitrogen atoms is much more restricted because of the ring structure to which the nitrogens are attached than the rotational freedom of the nitrogen atoms in TMED where essentially free rotation about the carbon-carbon and carbon-nitrogen bonds is allowed. Therefore, formation of the complex with 1,2-TMCHD results in the loss of less entropy than does complex formation with TMED. Thus, 1,2-TMCHD will form a complex preferentially.

Other factors to be considered, and which will become especially important when ring size and entropy considerations as discussed above are essentially equivalent, are steric hindrance and the respective nitrogen-nitrogen distances of the chelating agents to be separated.

Of course, stability also depends on the temperature of the reaction mixture. Complexes may be readily prepared at temperatures of about −50° to about 200°C., preferably 0° to 100°C. However, higher temperatures favor dissociation of the less stable complexes. Temperature then, may be adjusted to selectively complex the desired chelating agent.

Another factor to be considered is the lithium salt employed; i.e., its lattice energy and amount (previously discussed). The higher the lattice energy, the more selective complex formation will be; i.e., only chelating agents capable of forming quite stable complexes will combine with lithium salts having lattice energies near the previously stated maximum. Where the resulting complexes are of such similar structure and their relative stabilities cannot be accurately predicted, a trial run followed by appropriate adjustment of temperature, concentration, and/or use of a different lithium salt will still attain the desired separation.

It should be noted that complexation readily occurs by mixing the proper lithium salt with the chelating agent in the absence of solvent; however, such mixing may also be accomplished in the presence of inert hydrocarbons, e.g., $C_4$–$C_{20}$ alkanes (e.g., pentane, heptane, hexadecane); $C_6$–$C_{20}$ aromatics (e.g., benzene, toluene, xylene, dibutylnaphthalene); halogenated aromatics (e.g., chlorobenzene, dichlorobenzene, hexafluorobenzene); heterocyclic compounds (e.g., pyridine, pyrrole, furan, thiophene, sulfolane, borazole); or mixtures thereof.

The amount of the diluent is not critical and amounts in the range of 0 to 99.9 wt. %, based on the complex, may be conveniently employed. Thus, the complex can be prepared in the absence of solvents, in the form of pastes and in solvents.

Separation of Chelating Isomers

A particularly useful application of the present invention is the resolution of a racemate of an asymmetric or dissymmetric chelating agent into its d- and l-forms, i.e., its optical antipodes. By definition, an asymmetric molecule is one that lacks a simple axis of symmetry. A dissymmetric molecule lacks an alternating axis of symmetry. A dissymmetric molecule may or may not be asymmetric, and both are usually optically active. By an asymmetric atom or asymmetric center is meant a molecular arrangement in which a particular atom is joined to four different groups. (See, Eliel, "Stereochemistry of Carbon Compounds" (1962), Chapters 2 and 4.)

The inorganic lithium salt employed to separate these optical antipodes is one having at least one resolved asymmetric center present therein which is removed no more than four atoms from the lithium atom or is dissymmetric. This separation can be achieved because, although the original enantiomers of the chelating agent have identical properties, the diastereoisomers formed by complexation with the optically active lithium salt may differ widely in physical and chemical properties.

The optically active anions which may be used in this separation include or are derived from, but are not limited to, the following: l-menthol, D-desoxyephedrine, l-phenylalanine, l-borneol, etc.

A variation of the above separation process allows recovery of optically active lithium salts. This is accomplished by using an optically active chelating agent to separate a d-, l-mixture of the desired lithium salt. Thus, racemic α- or β- amino acids may be resolved using this technique; the amino acid to be resolved is used as the anion of the lithium salt.

Another application involves the separation of cis- and trans-isomers of the same chelating agent from each other. For instance, it was found possible to separate trans-1,2-TMCHD from cis-1,2-TMCHD. By studying models of the two isomers of 1,2-TMCHD it is possible to determine that the trans-isomer has less steric hindrance and a more favorable nitrogen-nitrogen distance for chelation than the cis-isomer. Therefore, it can be predicted that the trans-isomer will form complexes preferentially. This was found to be the case, and the trans-isomer was isolated from the cis-isomer in essentially 100% purity.

In order to verify that the isomers isolated were indeed pure cis- and pure trans-1,2-TMCHD, it was necessary to attempt a completely new synthetic route to the preparation of each isomer in pure form. It was found that the trans-isomer of the dihydrochloride salt of 1,2-diaminocyclohexane (CHDA) was much less soluble in methanol than the corresponding cis-isomer. A cis-, trans-mixture of CHDA and was dissolved in methanol and the dihydrochloride salt was prepared in situ by bubbling sufficient hydrogen chloride gas into the solution to convert the isomers to their dihydrochlorides. A precipitate was filtered from the solution and a sample of the precipitate was neutralized by a base such as NaOH. This sample, when analyzed by vapor phase chromatography (VPC), was found to be virtually 100% pure CHDA. By nuclear magnetic resonance (NMR) analysis a trans-structure was unambiguously assigned to the 100% pure CHDA.

A method for recovering the cis-isomer involves recovering from the methanol filtrate the dihydrochloride derivative of CHDA, which now contains a major amount of the cis-isomer and a minor amount of the trans-isomer; thereafter fractionaly crystallizing this mixture from ethanol, in which the cis-isomer is less soluble than the trans; finally, neutralizing the product obtained in the fractional crystallization with base and recovering the cis-CHDA in better than 90% purity as determined by VPC and NMR analyses.

Another synthetic route, similar to the above, may be employed to achieve the same results. A mixture of cis- and trans-CHDA is dissolved in ethanol and the resulting solution is treated with hydrogen chloride gas to convert the isomers to the respective dihydrochlorides. The precipitate which results is filtered from the solution and neutralized by a base such as NaOH. Analysis of a sample therefore by VPC and NMR discloses the substance to be cis- CHDA in beter than 90% purity. The next step is the recovery of the remaining material, which consists of a major portion of trans-CHDA and a minor portion of cis-CHDA, from the ethanol filtrate. This mixture is then fractionally crystallized from methanol and the crystals obtained are neutralized with base. Analysis of the recovered CHDA by VPC and NMR shows the substance to be trans-CHDA of better than 90% purity.

Both the cis- and the trans-isomers of CHDA may be separately methylated by reaction with formaldehyde and formic acid to yield their respective TMCHD isomers. The trans-isomer obtained by the stereospecific synthesis with a purity of 99+%, is compared with the product obtained via complex formation from the cis, trans-mixture of TMCHD. The compounds are identical. Thus, trans-TMCHD of very high purity (greater than 99%) may be obtained from a cis-, trans-mixture of TMCHD via complex formation.

Pure cis- and pure trans-TMCHD have heretofore been unknown. Their physical properties were determined to be as follows:

| Physical Properties | Cis | Trans |
| --- | --- | --- |
| Purity (by VPC) | 95+% | 99+% |
| Elemental Analysis, (Theory: C,70.52%; H,12.93%; N,16.47%) | C,69.46%; H,14.60%; N,16.36% | C,69.84%; H,12.82;% N,15.79% |
| Solubility in benzene, TMCHD.LiBr | 0.1M | 0.8M |
| Decomp. Temp. TMCHD.LiBr (at 0.5 mm Hg) | 80°C. | 125°C. |

Figure 2:
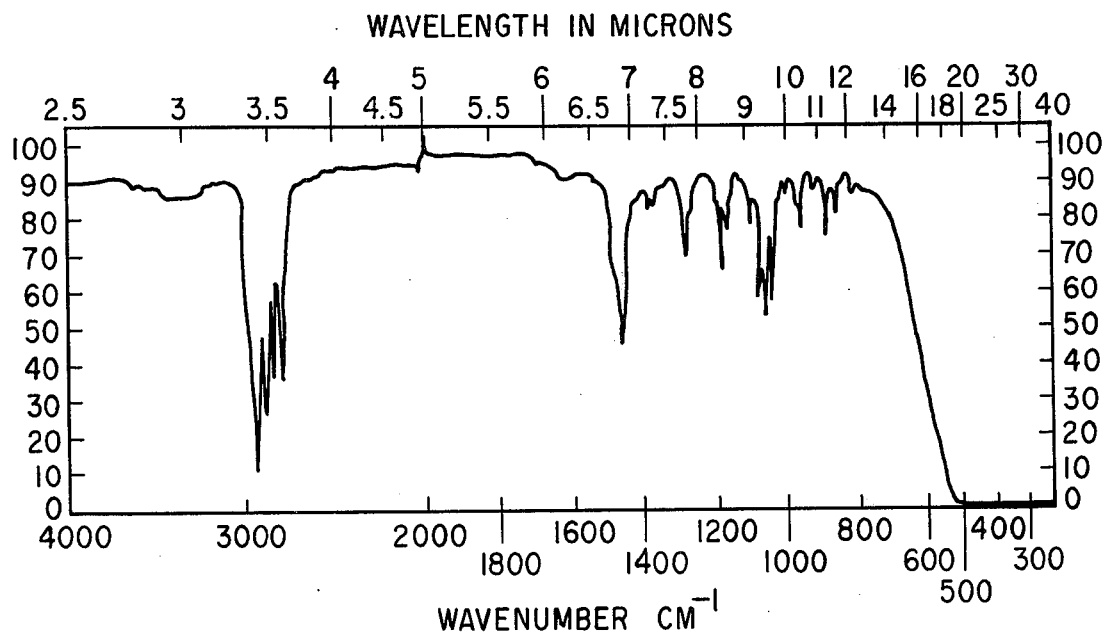
Figure 4:
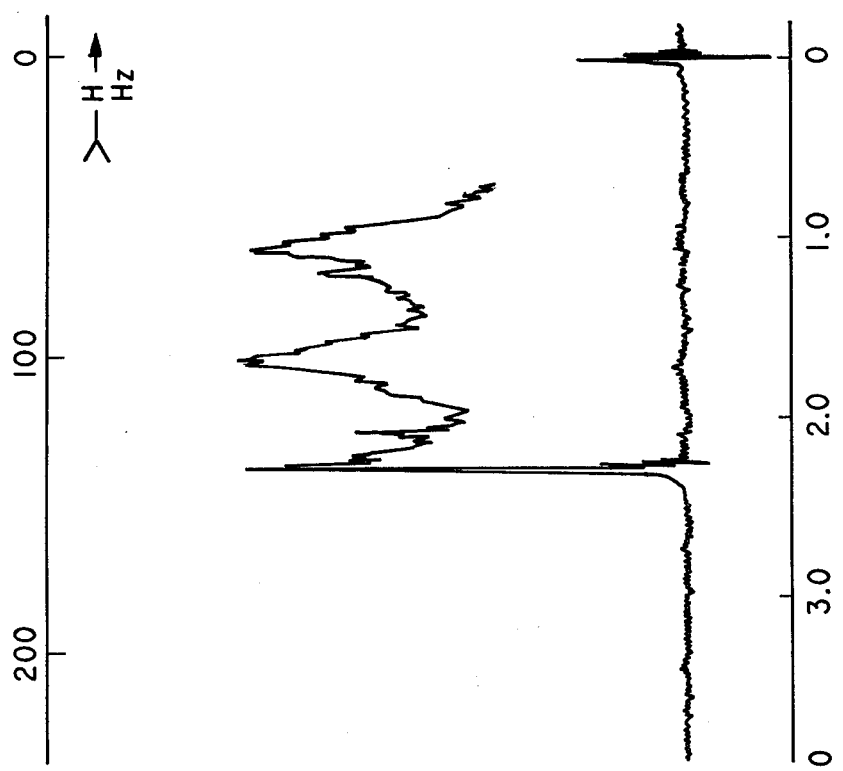
Figure 3:
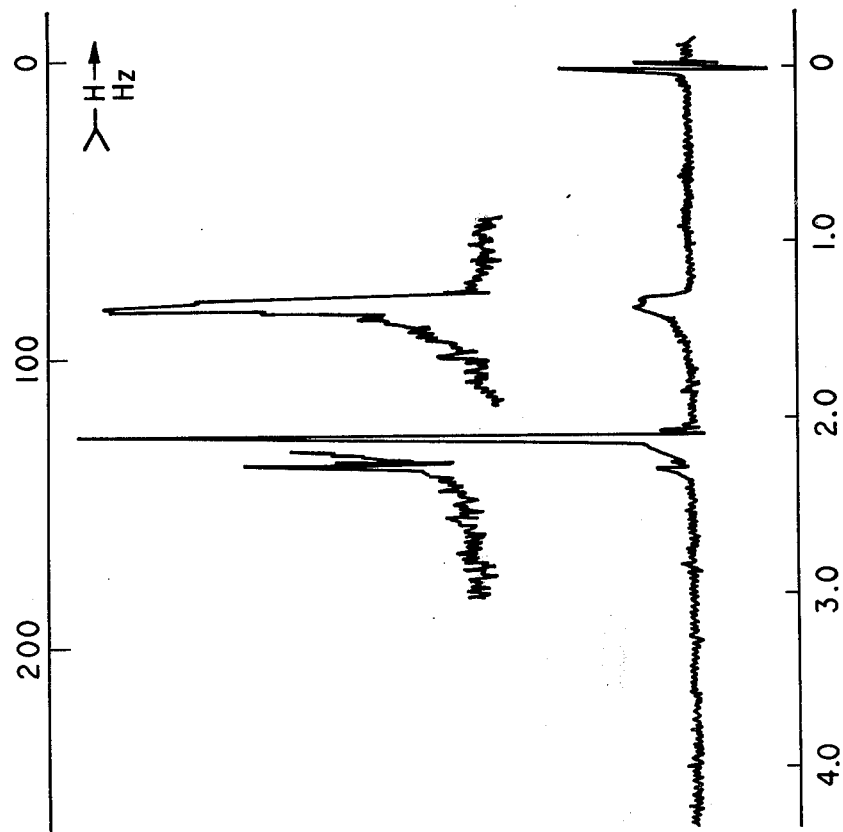

In the accompanying drawings, FIGS. 1 and 2 are the infrared spectra of cis-TMCHD and trans-TMCHD, respecively. The infrared spectra were obtained on the Beckman I.R.–20 with a pure sample (no solvent) between salt plates. FIGS. 3 and 4 are the nuclear magnetic resonance spectra of cis-TMCHD and trans-TMCHD, respectively. The 60 MHz NMR spectra were taken on a Varian A–60 of one molar (in benzene) solutions of the respective samples of ambient temperatures with a filter band width of 4 Hz, a R.F. field of 0.05 mG, a sweep time of 250 seconds and a sweep width of 500 Hz.

This invention is illustrated by the following examples:

EXAMPLE 1

Tetramethyl-1,2-cyclohexane-diamine was prepared from 1,2-diamino cyclohexane which consisted of 85% trans structure and 15% of a mixture containing cis structure, other structural isomers and impurities. Methylation was done in four steps each involving formation of an N-Li bond by reaction of the diamine with n-butyl lithium-TMED complex and reaction with CH₃I to obtain the N-CH₃ plus TMED.LiI. The net reaction is shown below:

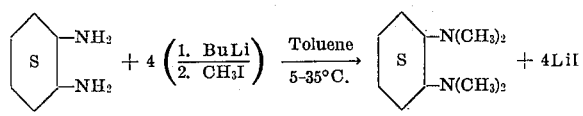

The reaction was carried out by charging 450 ml. dry toluene, 28.5 g. (0.24 mole) 1,2-diaminocyclohexane and 122 g. (1.05 mole) TMED to a 2 l flask fitted with two dropping funnels, one containing 435 ml. of hexane solution or 67.2 g. (1.05 mole) BuLi and the other funnel containing 150 g. (1.05 mole) CH₃I. The TMED was used to complex and activate the BuLi for the metalation of the amine groups and then to form a complex with the LiI and prevent this by-product from inactivating BuLi via aggregation. One-fourth of the BuLi solution was added at 5°–25°C. during 1 hr., then one-fourth of the CH₃I was added during 1 hr. at 5°–25°C. with good cooling. This cycle was repeated three more times to methylate all four amine hydrogens. A heavy white precipitate of TMED.LiI and TMCHD.LiI was filtered and vacuum dried, yielding 263 g. (95.5% of theory) of the mixed chelates which had separated from various reaction by-products, isomers and impurities.

TMCHD and TMED were removed from the LiI complexes by reaction with 700 ml. 3.2M NaOH and extraction of the organic phase with heptane. The two chelating agents were then separated easily by distillation. TMCHD was obtained as a colorless liquid (b.p. 51°–58°C./5 mm.), which V.P.C. analysis showed to be 88% trans.

EXAMPLE 2

Tetramethyl-1,2-cyclohexanediamine was prepared in 90% yield via the following reaction:

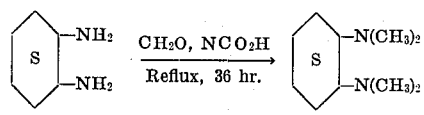

The reaction product was distilled and found to be 95.8% pure TMCHD by gas-liquid chromatography. The distilled product contained four impurities which could not be removed by distillation (tert.-amines having almost exactly the same boiling point and the same molecular weight as TMCHD). One impurity was identified as N,N,N',N'-tetramethyl-1,3-cyclohexanediamine.

Solid LiBr.xH₂O (~0.9 equivalent) was added to the distilled TMCHD and the resultant semi-solid was allowed to stand 48 hours. Heptane was added to form a slurry which was then allowed to stand 72 hours. The slurry was then filtered, washed with additional heptane and hydrolyzed (i.e., destablized) with aqueous KOH. The hydrolysis mixture was made basic with aqueous NaOH and TMCHD of 99.6% purity (by vapor phase chromatography) was obtained by distillation of the product recovered from the hydrolysis mixture.

EXAMPLE 3

159 g. (1.39 mole) of crude 1,2-diaminocyclohexane (mixed isomers) were added dropwise to 780 ml. of 90% formic acid and to the warm solution was added 435 ml. of 40% aqueous formaldehyde. The reaction mixture was refluxed for 16 hours and 50 ml. of formaldehyde was added. After 28 hours of refluxing, 50 ml. more formaldehyde was added (535 ml. total) and refluxing was continued for a total of 43 hours.

The reaction mixture was cooled, 258 ml. of concentrated HCl was added and the mixture was evaporated in a rotary evaporator. Water, 700 ml., was added to the residue and the solution was again evaporated in a rotary evaporator. To the salt cake was added 450 ml. of water followed by a solution of 170 g. of NaOH in 320 ml. of water with ice bath cooling. A second phase formed which are taken up in 300 ml. of hexane and after separation of phases the aqueous phase was saturated with NaCl and extracted with 300 ml. of hexane. The combined hexane extracts were dried over anhydrous K₂CO₃ and evaporated leaving an oil.

To the crude product was added 20.8 g. of TMCHD from another preparation and the whole was distilled through a 15 plate Oldershaw column with a 5:1 reflux ratio:

| Pot Temp. °C. | Head Temp. °C. | Press (mm) | Cum. Vol. (ml.) | Cut Vol. (ml.) | Cut Wt.(g.) |
|---|---|---|---|---|---|
| 105 | 79 | 5 | 1 | | |
| 106 | 87 | 5 | 6 | | Cut I |
| 105 | 86 | 5 | 30 | 80 | 25.9 |
| 106 | 87 | 5 | 40 | | |
| 106 | 88 | 5 | 72 | | |
| 105 | 87.5 | 5 | 90 | | |
| 105 | 87.5 | 5 | 120 | | |
| 105 | 87.5 | 5 | 160 | | |
| 105 | 87 | 5 | 240 | | Cut II |
| 105 | 87 | 5 | 246 | 216 | 190.3 |

A pot residue of 16.4 g. remained. Total yield of distilled product (corrected for the addition of 20.8 g. of material) was 212 g. or 90% of theory. VPC analysis (10 foot 15% Carbowax 20M-KOH on 60/80 mesh Chromosorb W column at 110°C.) showed that Cut II material was 95.8% one component containing at least four impurities. The latter were presumed to be incompletely methylated species. Therefore, a 3 g. portion of Cut II product was treated with 10 mole % n-C₄H₉Li in heptane and after 15 min. the volatiles were distilled overhead and reanalyzed by VPC. No charge in product composition was found on a solvent free basis. Some of the main component was isolated by preparative VPC and reanalyzed. The impurity peaks were absent, thus demonstrating that they were not TMCHD decomposition products formed during gas chromatography. One of the impurities was identified as cis-TMCHD.

A 3.4 g. portion of Cut II TMCHD was mixed with 1.57 g. of LiBr·(H$_2$O)$_x$. The TMCHD was assumed to be 90% pure and the LiBr was assumed to have a molecular weight of 90. A thick slurry resulted which was allowed to stand under nitrogen for 2 days. Then 2 ml. of heptane was added to the slurry with thorough mixing. After 3 more days a 7 ml. portion of heptane was added and the slurry was filtered. The residue was washed with 3 ml. of heptane and dissolved in 3 ml. of water to which was added a solution of 2 g. of KOH in 2 ml. of water. A 3 ml. portion of heptane was added, the layers were separated, the organic phase was dried over anhydrous K$_2$CO$_3$ and analyzed by VPC. The product which was assigned the trans-structure of TMCHD, was found to be 99.6% pure on a solvent free basis. One impurity had been completely removed while the others, including the cis-isomer, had been greatly reduced.

EXAMPLE 4

To verify that the trans-structure assigned in Examples 2 and 3 was correct, the following work was performed.

A 200 g. portion of 1,2-diaminocyclohexane (~60% trans-40% cis) was added to one quart of CH$_3$OH. HCl gas was bubbled into the stirred solution, which refluxed, until no free diamine or monohydrochloride remained. Near the end of the HCl addition, a white solid precipitated. The reaction mixture was filtered and the residue was washed with ether and dried, wt. 96.9 g. (30% of theory) (crop 1). The filtrate was diluted with 4.5 lbs. of solvent ether and cooled to −20°C. whereupon a second crop of crystals deposited. Crop 2 was collected and dried, wt. 186.3 g. (56.6% theory).

A one gram portion of crop 1 material was converted to the free diamine by reaction with 50% aqueous NaOH solution (2 ml.). By VPC the diamine was found to be virtually 100% pure and by NMR the trans-structure was unambiguously assigned.

Crop 2 dihydrochloride, 180 g., was refluxed in 1400 ml. of 95% C$_2$H$_5$OH and the solution was filtered. The filtrate was reduced in volume to 1200 ml. and cooled, whereupon a crop of needle-like crystals separated which were isolated by filtration, wt. 29.1 g. One gram of this solid was converted to the free diamine which was found to be almost 100% pure by VPC analysis and to defintely have the cis-structure by NMR analysis.

The two diaminocyclohexane dihydrochlorides were converted to their respective TMCHD isomers via reaction with formaldehyde and formic acid. Trans-TMCHD was obtained 99+% pure in a yield of 90% and cis-TMCHD was obtained 95+% pure in 68% yield. Both isomers were characterized by elemental analysis; theory for C$_{10}$H$_{22}$N$_2$, C, 70.52%, H, 12.93%, N, 16.47%; found for trans-TMCHD C, 69.84%, H, 12.82%, N, 15.79%; found for cis-TMCHD C, 69.46%, H, 14.60%, N, 16.36%, by IR spectroscopy (FIGS. 1 and 2); by NMR spectroscopy (FIGS. 3 and 4) and as chelates with LiBr. Trans-TMCHD·LiBr was found to have a solubility of 0.8 M in benzene while cis-TMCHD·LiBr was soluble to the extent of 0.1 M in benzene. The trans-chelate decomposed at 125°C. (at 0.5 mm Hg). and the cis-chelate decomposed at 80°C. (at 0.5 mm Hg). Analysis: theory for C$_{10}$H$_{22}$N$_2$LiBr C, 46.71%, H, 8.62%, N, 10.89%, Br, 31.08%; found for cis-TMCHD·LiBr C, 46.7%, H, 9.8%, N, 10.8%, Br, 31.5%; found for trans-TMCHD·$^{LiBr}$ C, 47.78%, H, 9.25%, N, 11.21%, Br, 31.42%.

A mixture of the two TMCHD isomers gave two peaks upon VPC analysis. A mixture of authentic trans-TMCHD and the product from the purification of impure trans-TMCHD via complex formation in Examples 2 and 3 with LiBr gave one VPC peak. Thus trans-TMCHD of very high purity (>99%) was obtained from impure trans-TMCHD containing cis-TMCHD via complex formation with LiBr.

EXAMPLE 5

6.1 g. of crude cis and trans-1,2-diaminocyclooctane were methylated with formaldehyde and formic acid as in Example 2. A total of 5.1 g. of distilled impure cis- and transtetramethyl-1,2-cyclooctanediamine (b.p. 47°–53°C./0.29 mm) was obtained from the methylation reaction which by VPC analysis contained six components: A, 2.1%; B, 10.7%; C, 19.6%; D, 14.8%; E, 7.5%; F, 45.4%. The methylated diamine mixture was diluted with 10 ml. of heptane, 0.86 g. of LiBr was added, and the resulting pasty mixture was stirred for 3 days. VPC analysis of the liquid phase gave the following composition: A, 2.8%; B, 13.6%; C, 6.9%; D, 6.4%; E, 11.4%; F, 59.0%. The solid was recovered by filtration washed with pentane, dried and hydrolyzed with 3 ml. of 10% NaOH solution. The resulting organic phase was extracted with heptane. The heptane was removed under pressure and the oily residue was examined by VPC. The material was found to be A, 1.48%; B, 0%; C, 63.6%; D, 30.18%; E, 0%; F, 1.3%. Components C and D were identified by time of flight mass spectral analysis as cis- and transtetramethyl-1,2-cyclooctanediamine. Thus, the desired diamine was recovered in 93.7% purity by a single treatment starting with only 34.4% pure feed.

The above data demonstrate that chelating diamines may be separated from and/or purified of closely related impurities via complex formation with an inorganic lithium salt. The chelating diamine may be recovered by destabilization of the intermediate complex by heating or hydrolysis, etc.

EXAMPLE 6

To 2.865 g. of a 1:1 molar mixture of tetramethylethylenediamine (TMED) and tetramethyl-1,2-cyclohexanediamine (TMCHD) (5 mmole TMED and 5 mmole TMCHD) at room temperature was added 0.191 g. (4.5 mmole) of lithium chloride. The LiCl expanded to several times its original volume and after four days 3.2 ml. of heptane was added to the mixture and the solid phase was recovered by filtration and washed twice with 1 ml. portions of heptane. The dried solid was dissolved in 1.8 ml. of 50% NaOH solution and the liberated diamine was found by VPC to be virtually pure TMCHD. The filtrate from the above filtration was found to contain almost no TMCHD by VPC analysis.

When separation of TMED and TMCHD was attempted using LiBr of LiI in the above procedure, negative results were obtained under the same conditions. However, if the temperature should be raised sufficiently above room temperature (e.g., to about 80°C.), separations of TMED and TMCHD would be successful. Thus, in order to achieve a particular separation, the proper conditions must be employed.

The most selective separations occur when the lattice energy of the lithium salt is sufficiently high so that complexation can occur with only one component. When the lattice energy of the salt permits multiple complexations, higher temperatures are used to destabilize the weaker complexes and increase selectivity.

EXAMPLE 7

2.3 g. (10 mmole) of 91.8% pure hexamethyltriethylenetetramine (HMTT), in which the impurity was tris-($\beta$-dimethylaminoethyl)amine (iso-HMTT), was put in a vial and diluted with 5 ml. of heptane. To the solution was added 0.5 g. of LiBr and the mixture was shaken on a mechanical shaker for 1 hour. The mix was allowed to stand and a sample of the overstanding liquid was analyzed by VPC and found to be 98.1% pure HMTT on a non-solvent basis. Thus, geometrically isomeric chelating agents may be separated and/or purified by means of this invention. It has been found that the separation of HMTT from iso-HMTT is extremely difficult by other means such as distillation.

EXAMPLE 8

0.72 g. (5 mmole) of N,N,N',N'-tetramethyl-1,4-butanediamine (1,4-TMBD) and 0.72 g. (5 mmole) of N,N,N',N'-tetramethyl-1,3-butanediamine (1,3-TMBD) were added to 5 ml. of n-heptane. To the solution was added 0.435 g. (5 mmole) of LiBr and the mixture was shaken on a mechanical shaker for 18 hours. The mixture was allowed to settle and the liquid phase was analyzed by VPC. On a solvent-free basis the composition of the diamines in the liquid phase was 95% 1,4-TMBD. An additional 0.1 g. (1.38 mmole) of LiBr was added to the sample and shaking was resumed for 13 hours. The liquid phase was again analyzed by VPC and found to be 97% 1,4-TMBD on a solvent-free basis.

The slurry was filtered and the filtration residue was washed with 3 ml. of hot (60°C.) heptane and dried. The solid was hydrolyzed with 2 ml. of water and the water solution was made basic with excess KOH whereupon an upper organic phase formed which was recovered by 3 ml. heptane extraction. The extract was dried over anhydrous $K_2CO_3$ and analyzed by VPC. On a solvent-free basis the product was found to be 97% 1,3-TMBD. Hence isomeric chelating agents of the same carbon number having very similar boiling points may be separated by virtue of differences in chelate stability with inorganic lithium salts.

EXAMPLE 9

By the same procedure as described in Example 8, a mixture of 0.86 g. (5 mmole) of N,N,N',N'-tetramethyl-1,6-hexanediamine (1,6TMHD) and 0.85 g. (5 mmole) trans-N,N,N',N'-tetramethylcyclohexane-1,2-diamine (t-TMCHD) in heptane solution was treated with a total of 0.535 g. (6.38 mmole) LiBr. On a solvent-free basis the liquid phase of the reaction mixture was found to be 95% 1,6-TMHD by VPC analysis. The hydrolyzed solid gave 85% pure t-TMCHD. However, if the 12.8% excess complexing capacity of the additional 0.1 g. of LiBr is subtracted, a product of about 97% pure t-TMCHD would be obtained.

Also, by the same procedure as described in Example 7, a mixture of 0.86 g. N,N,N',N'',N''-pentamethyldiethylenetriamine (PMDT) (MW=173) and 0.86 g. of N,N,N',N'-tetramethyl-1,6-hexanediamine (1,6-TMHD) (MW=172) in heptane solution was treated with a total of 0.535 g. (6.38 mmole) LiBr. On a solvent-free basis the liquid phase of the separation reaction mixture was virtually 100% 1,6-TMHD by VPC analysis. Thus, chelating agents may be separated from non-chelating agents of virtually the same molecular weight and carbon number by chelate formation with the proper inorganic lithium salt.

EXAMPLE 10

Set forth in Table I are the thermal stabilities and benzene solubilities at room temperature of several crystalline complexes. These data indicate that the complexes have different stabilities and solubilities. Thus, lithium salts can be separated from one another and from other metal salts, and chelating agents may be separated from one another and from other materials. The purified lithium salts and chelating agents can be readily recovered by merely heating the complex alone or in solution at preferably above its decomposition temperature (the lithium salt starts to precipitate out at such temperatures); such destabilization heating may also be advantageously accomplished in the presence of a hydrocarbon which will solubilize the chelating agent, but not the complex or the lithium salt. Although quantitative recovery (by heating or other destabilization techniques) of the lithium salt and chelating agent is not possible in a single batch operation (because of equilibria of the destabilization reaction), a cyclic process can (and should) be used if quantitative recovery is desired.

TABLE I

| Lithium Salt | Complexing Agent | Decomposition Temp., °C. (at ~0.5 mm Hg) | Solubility in Benzene (molar) |
| --- | --- | --- | --- |
| LiCl | trans-TMCHD | 29 | 0.5 |
| LiBr | trans-TMCHD | 125 | 0.8 |
| LiI | trans-TMCHD | 203 | 0.3 |
| LiBr | cis-TMCHD | 80 | 0.1 |
| LiAlH$_4$ | TM-o-PD | — | 1.01 |
| LiI | TM-o-PD | 97 | 0.4 |
| LiBr | TMED | 50–100 | 1.6 |
| LiNO$_3$ | TMED | — | 0.3 |
| LiAlH$_4$ | TMED | 125 (at 1.3 mm) (a) | 0.82 |
| LiBH$_4$ | TMED | — | 1.0 |
| LiAlH$_4$ | 2 TMED | —(b) | 0.17 |
| 2 LiBr | HMTT | ~143 | ~0.1 |
| LiBr | HMTT | ~40 | ~0.3 |
| LiNO$_3$ | HMTT | — | ~3.0 (j) |
| LiBH$_4$ | HMTT | — | 3.0 |
| LiAlH$_4$ | HMTT | 200(c) | 0.005 |
| LiBF$_4$ | HMTT | — | 1.3 |
| 3 LiI | HMCHT | 60 | >0.1 |

TABLE I –Continued

| Lithium Salt | Complexing Agent | Decomposition Temp., °C. (at ~0.5 mm Hg) | Solubility in Benzene (molar) |
|---|---|---|---|
| LiAlH₄ | TM-o-PDA | — | 1.01 |
| LiI | TMBT | 72 | 0.2 |
| LiCl | PMDT | 70 | 2.5 |
| LiBr | PMDT | 86 (d) | 2.5 |
| LiI | PMDT | sublimes (e) | 2.5 |
| LiNO₃ | PMDT | — | 2.66 |
| LiBH₄ | PMDT | 75 (at 1 mm) (f) | forms gel (i) |
| LiAlH₄ | PMDT | — (g) | 1.8 |
| LiBF₄ | PMDT | — (h) | 0.19 |
| LiPF₆ | PMDT | — | 1.25 |
| LiB (C₆H₅)4 | PMDT | — | 0.04 |

(a) blackens above 176°C.
(b) M.P. 118-120°C.
(c) Stable to 200°C.; M.P. > 200°C.
(d) M.P. 92-93.5°C.
(e) M.P. 89-110°C.
(f) M.P. 74-81°C.
(g) sublimes w/o decomp. at 125°C./0.5 mm; M.P. 150-155°C.
(h) M.P. 118-121°C.
(i) Solubility greater than 3 molar at 25°C.
(j) HMTT.LiNO₃ is a liquid at 25°C. and is miscible with benzene.
(k) N,N,N',N'-tetramethyl-O-phenylenediamine.

EXAMPLE 11

0.1901 g. (4.5 mmole) LiCl was mixed with 0.6734 g. (4.5 mmole) NaI and to the anhydrous salt mixture was added 3 ml. (~15 mmole) of trans-TMCHD and the whole was allowed to stand at room temperature for 3 days. To the slurry was added 5 ml. of benzene with stirring. After 2 more days, the mixture was filtered and the solid was washed with two 4 ml. portions of benzene. The solid was then thoroughly dried, yield: 0.675 g.

The above filtrate was analyzed for chlorine and iodine and was found to contain 1.8 mmole Cl and 1.5 mmole I. In addition, the filtrate was analyzed for lithium and sodium and was found to contain 3.6 mmole Li and no sodium.

The above results demonstrate that inorganic lithium salt chelates may be prepared by anion exchange reactions because the only way that iodine could occur in the above filtrate in the absence of sodium is if the following reaction took place:

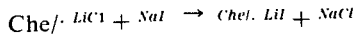

Secondly, the above data show that lithium salts may be separated from sodium salts by contacting a salt mixture with a hydrocarbon solution of the proper chelating agent.

Thirdly, the above results demonstrate that halogens may be recovered from salt mixtures with the aid of lithium salts and hydrocarbon solutions of chelating agents. By choice of the proper chelating agent and reaction conditions, e.g., temperature, such a process may be made highly selective for a particular halide ion, e.g., iodide ion.

EXAMPLE 12

1.06 g. (250mmole) of LiCl and 3.35 g. (25 mmole) of LiI were intimately mixed and added to 50 ml of benzene. To the slurry was added 4.33 g. (25 mmole) of pentamethyldiethylenetriamine (PMDT) and the mixture was stirred for 18 hours at room temperature. The turbid mixture was then filtered and the solid residue was washed with three 7 ml portions of benzene and dried; wt. 0.98 g. An additional 0.05 g. was recovered from the washings. The solid was analyzed for chlorine and iodine: Found 81.39% Cl, 0.00% I; theory for LiCl. 83.63% Cl.

The above filtrate was evaporated leaving a white crystalline residue; wt. 7.70 g; theory, 7.68 g. Analysis for chlorine and iodine gave 0.00% Cl and 42.84% I while theory for PMDT· LiI is 41.32% I.

Thus mixtures of lithium salts may be separated and/or purified via complex formation with the proper chelating agent.

EXAMPLE 13

A 200 g. portion of 1,2-diaminocyclohenaze (~60% trans-40% cis) is added to 500 ml of ethanol. HCl gas is bubbled into the stirred solution which becomes warm until no free diamine or monohydrochloride remains. Near the end of the reaction a white solid precipitates which is recovered by filtration, is washed with ether and is dried. The solid is dissolved in water and the solution is made basic with NaOH. An organic phase separates which is recovered by extraction with η-heptane. The solvent is evaporated leaving an oil which is found to be cis-1,2-diaminocyclohexane of > 90% purity by VPC and NMR analysis.

While the above Examples illustrate the invention in great detail, it should be understood that the present invention in its broadest aspects is not necessarily limited to the specific materials, conditions and procedures shown therein. The present invention is limited only by the claims which follow.

What is claimed is:

1. A process for separating trans-1,2-cyclohexanediamine from a mixture of cis and trans-1,2-isomers of cyclohexanediamine which comprises the steps of:
   1. dissolving the mixture of isomers in methanol and treating the resultant solution with sufficient HCl gas to convert the isomers to their respective dihydrochlorides;
   2. filtering the precipitate resulting from step (1) leaving behind a methanol filtrate containing a mixture of a major amount of the cis-1,2-isomer dihydrochloride and a minor amount of the trans-1,2-isomer dihydrochloride and a minor amount of the trans-1,2-isomer dihydrochloride;
   3. neutralizing the precipitate from step (2), and recovering trans-1,2-cyclohexanediamine of at least 95% purity.

2. A process for separating trans-1,2-cyclohexanediamine from a mixture of cis and trans- 1,2-isomers of cyclohexanediamine which comprises the steps of:

1. dissolving the mixture of isomers in methanol and treating the resultant solution with sufficient HCl gas to convert the isomers to their respective dihydrochlorides;
2. filtering the precipitate resulting from step (1) leaving behind a methanol filtrate containing a mixture of a major amount of the cis-1,2-isomer dihydrochloride and a minor amount of trans-1,2-isomer dihydrochloride;
3. neutralizing the precipitate from step (2), and recovering trans-1,2-cyclohexanediamine of at least 95% purity;
4. recovering from the methanol filtrate the mixture of the cis and trans-1,2-isomers in their dihydrochloride forms;
5. fractionally crystallizing from ethanol the mixture recovered in step (4);
6. neutralizing the crystals obtained from step (5 and recovering cis-1,2-cyclohexanediamine of at least 95% purity.

3. A process for separating cis-1,2-cyclohexanediamine from a mixture of cis and trans-1,2-isomers of cyclohexanediamine which comprises the steps of:

1. dissolving the mixture of isomers in ethanol and treating the resultant solution with sufficient HCl gas to convert the isomers to their respective dihydrochlorides;
2. filtering the precipitate resulting from step (1) leaving behind an ethanol filtrate containing a mixture of a major amount of the trans-1,2-isomer dihydrochloride and a minor amount of the cis-1,2-isomer dihydrochloride;
3. neutralizing the precipitate from step (2), and recovering cis-1,2-cyclohexanediamine of at least 95% purity;
4. recovering from the ethanol filtrate the mixture of the cis and trans-1,2-isomers in their dihydrochloride forms;
5. fractionally crystallizing from methanol the mixture recovered in step (4);
6. neutralizing the crystals obtained from step (5) and recovering trans-1,2-cyclohexanediamine of at least 95% purity.

* * * * *